United States Patent [19]
Distler

[11] 3,766,944
[45] Oct. 23, 1973

[54] PILOT CONTROLLED FLUID FLOW REGULATING VALVE

[75] Inventor: Josef Distler, Lohr am Main, Germany

[73] Assignee: G. L. Rexroth GmbH, Lohr/Main, Germany

[22] Filed: Oct. 19, 1972

[21] Appl. No.: 299,018

[30] Foreign Application Priority Data
Oct. 20, 1971 Germany.................... P 21 52 133.5

[52] U.S. Cl............................. 137/625.6, 137/636.2
[51] Int. Cl........................................... F16k 11/00
[58] Field of Search.................... 137/625.6, 625.64, 137/596.14, 636.2; 251/25, 57; 60/54.6

[56] References Cited
UNITED STATES PATENTS

| | | | |
|---|---|---|---|
| 3,304,953 | 2/1967 | Wickline et al.............. | 137/625.6 X |
| 3,340,897 | 9/1967 | Nevulis.......................... | 137/625.6 |
| 3,500,865 | 3/1970 | Gerber et al..................... | 137/625.6 |

*Primary Examiner*—Henry T. Klinksiek
*Assistant Examiner*—Robert J. Miller
*Attorney*—Michael S. Striker

[57] ABSTRACT

A fluid flow regulating valve wherein the housing receives a reciprocable spool and has a chamber which can receive pressurized fluid from a pump by way of a pilot valve to thereby move the spool from a neutral position to an intermediate position and thereupon to one of several operative positions. The fluid pressure in the chamber acts against one end face of a piston which is mounted in the body of the pilot valve and can be displaced by a control spring which can be deformed by a manually operated handle. A relatively minor deformation of the control spring suffices to move the spool to the intermediate position so that the spring can undergo a much larger additional deformation in order to move the spool to a selected operative position. A regulating spring in the housing of the regulating valve does not oppose the movement of the spool to intermediate position but the regulating spring offers a substantial resistance to movement of the spool to an operative position. This enables the operator to sense that the control spring offers a greatly increased resistance to further deformation by the handle.

10 Claims, 2 Drawing Figures

PATENTED OCT 23 1973

PILOT CONTROLLED FLUID FLOW REGULATING VALVE

BACKGROUND OF THE INVENTION

The present invention relates to valves in general, and more particularly to improvements in valve assemblies of the type wherein the movable valve element (e.g., a reciprocable spool) of a fluid flow regulating valve is displaced by a pressurized fluid medium whose pressure is controlled by a pivot valve. Still more particularly, the invention relates to improvements in the construction and mode of operation of hydraulic regulating valves and pilot valves in such valve assemblies.

It is already known to control the pressure of fluid which displaces the spool of a fluid flow regulating valve by means of one or more pilot valves which can be actuated by hand or by remote control to select the pressure of fluid acting on the spool and hence the position of the spool relative to the body of the fluid flow regulating valve. As a rule, the regulating valve employs a spring or analogous biasing means for urging the spool to a neutral position.

An advantage of such valve assemblies is that the pilot valve can be mounted at any desired distance from the fluid flow regulating valve. Also, the pilot valve can be adjusted to any one of a practically unlimited number of different positions to thus insure that the pressure of fluid acting upon the spool of the fluid flow regulating valve can be selected with an extremely high degree of accuracy.

A drawback of presently known valve assemblies wherein a regulating valve e.g., a four-way directional control valve having a reciprocable spool, is controlled by a pilot valve is that the movements of the spool in the regulating valve from the neutral position to other positions necessitate the application of a substantial fluid pressure. A substantial fluid pressure must be applied in order to displace the spool to the extent which is necessary to insure that the spool reaches an intermediate position. When caused to move beyond such intermediate position, the spool begins to establish or terminate the flow of fluid between one or more fluid admitting ports and one or more fluid discharging ports. The fluid pressure which is necessary to effect such displacement of the spool depends on the deformation or stressing of a control spring in the pilot valve. This deformation of the control spring must be detracted from the overall deformation of the control spring, i.e., the extent of additional deformation of control spring during movement of the spool beyond the intermediate position is greatly reduced because the control spring has already undergone substantial deformation during movement of the spool from the neutral position to the intermediate position. Furthermore, only a skilled operator can determine the exact moment when the spool of the fluid flow regulating valve has reached the intermediate position, namely, that position beyond which the spool must be moved in order to start the regulation of fluid flow. This is due to the fact that the fluid pressure, and hence the bias of the control spring in the pilot valve, has risen substantially during movement of the spool from the neutral position to the intermediate position. Consequently, a less skilled operator is unable to accurately select one of several positions of the spool in which the spool actually regulates the flow of fluid between one or more fluid-admitting ports and one or more fluid-discharging ports which are provided in the body of the regulating valve. For example, a fluid admitting port can be connected with the pressure side of a pump, a first fluid-discharging port can be connected with the inlet of a consumer of hydraulic fluid, and a second fluid-discharging port can be connected with the tank.

SUMMARY OF THE INVENTION

An object of the invention is to provide a novel and improved valve system or valve assembly wherein the pressure of fluid which displaces a spool or an analogous valve element in a fluid flow regulating valve is controlled by a pilot valve.

Another object of the invention is to provide a valve system which is constructed and assembled in such a way that the displacement of the valve element in the regulating valve from its neutral or idle position to an intermediate position beyond which the valve element starts to regulate the flow of fluid between two or more ports necessitates minimal changes in the stressing of the control spring in the pilot valve so that the extent to which the control spring can be deformed during actual regulation of fluid flow by the valve element of the regulating valve is much greater than in heretofore known valve assemblies.

A further object of the invention is to provide a valve assembly wherein the fact that the valve element of the regulating valve has reached its intermediate position can be readily detected by skilled or unskilled operators so that the person in charge can immediately determined the exact moment when the valve element begins to regulate the rate of fluid flow through the body of the regulating valve.

An additional object of the invention is to provide a novel and improved pilot valve and a novel and improved fluid flow regulating valve for use in a valve assembly of the above outlined character.

An ancillary object of the invention is to provide a valve assembly wherein the position of the valve element in the regulating valve can be controlled by a single pilot valve or by a twin pilot valve having two discrete control springs.

The invention is embodied in a valve assembly which comprises a regulating valve including a housing provided with a fluid-receiving chamber, and a reciprocable or otherwise movable valve element (e.g., a spool) which can be moved in the housing from a neutral position, through an intermediate position and to a plurality of operative positions in response to admission of pressurized fluid into the chamber. The valve assembly further comprises a pilot valve having a body provided with inlet means connected to a pump or another suitable source of pressurized fluid (such as oil) and port means connected to the chamber in the housing of the regulating valve (e.g., by way of a hose or another conduit), a valve member which is movable in the body of the pilot valve to control the flow of fluid between the inlet means and the port means (and preferably also between the port means and outlet means provided in the body of the pilot valve) and having a surface which is exposed to fluid pressure prevailing in the chamber of the regulating valve, control spring means mounted in the body of the pilot valve and being deformable to thereby displace the valve member against the opposition of fluid pressure acting against the surface of the valve member, and means for subjecting the control spring means to a relatively small initial deforming force so as to balance the fluid pressure against the surface of the valve member and to thereby maintain the valve member in a position in which the latter seals the port means from the inlet means after the valve element of the regulating valve has assumed its intermediate position, and to a relatively wide range of additional deforming forces in order to displace the valve member so as to allow additional pressurized fluid to enter the regulating valve and to move the valve element to a selected operative position (in such operative position, the valve element allows a fluid to flow between one or more fluid admitting ports and one or more fluid discharging ports of the housing).

The regulating valve further comprises regulating spring means which offers little or no resistance to movement of the valve element from its neutral position to its intermediate position but offer a substantial resistance to movement of the valve element to an operative position. This is sensed by the operator who actuates the means for deforming the control spring means so that the operator knows when the valve element dwells in the intermediate position or in one of the operative positions.

The novel features which are considered as characteristic of the invention are set forth in particular in the appended claims. The improved valve assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
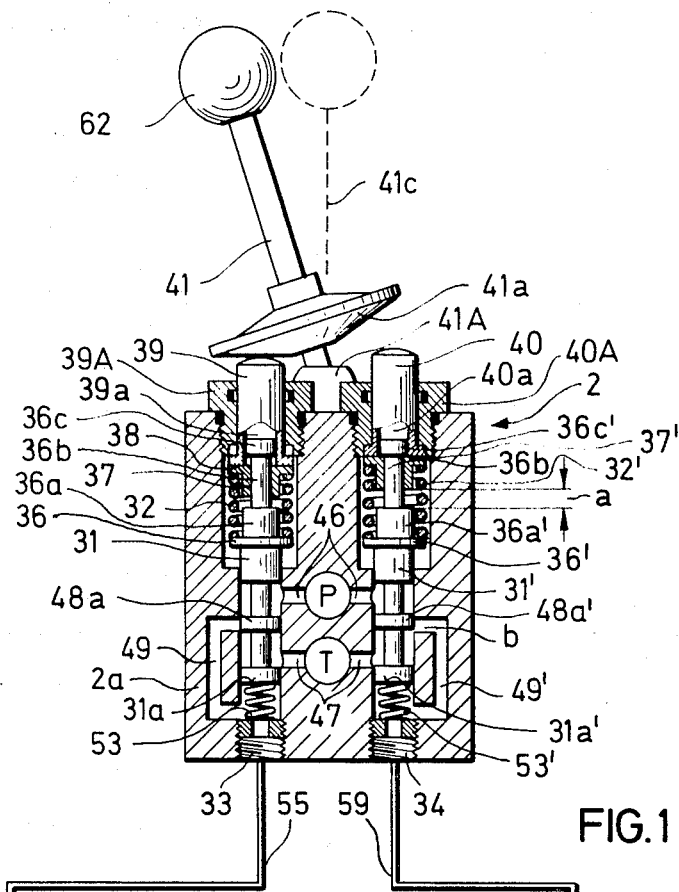
FIG. 1 is an axial sectional view of the pilot valve and fluid flow regulating valve in a valve assembly which embodies one form of the invention.

Referring to FIG. 1, there is shown a fluid flow regulating valve 1 which is a four-way directional control valve and is controlled by a pilot valve 2. The pilot valve 2 comprises a body 2a having two parallel bores for discrete pilot valve members 31, 31'. These valve members respectively comprise disk-shaped extensions 36, 36' which are respectively integral with cylindrical centering elements 36a, 36a' for two control springs 32, 32'. The centering elements 36, 36a' are provided with internal threads mating with external threads of pins 36b, 36b' which are respectively provided with cylindrical heads 36c, 36c'.

The pins 36b, 36b' are inwardly adjacent to reciprocable actuating pins 39, 40 having axial blind bores 39a, 40a for the cylindrical heads 36c, 36c'. The pins 39, 40 are respectively reciprocable in sleeves 39A, 40A which are mounted in the pilot valve body 2a. The extent of upward movement of the actuating pins 39, 40 under the action of the respective control springs 32, 32' is determined by flanges at the inner ends of pins 39, 40 and by internal shoulders provided for such flanges in the respective sleeves 39A, 40A. The body 2a of the pilot valve 2 further accommodates two annular retainers 37, 37' which are respectively engaged by the uppermost convolutions of control springs 32, 32' and normally bear against the inner end faces 38, 38' of the actuating pins 39, 40. The retainers 37, 37' further bear against the respective heads 36c, 36c' so that the initial stressing of the control springs 32, 32' can be changed by rotating the pins 36b, 36b' relative to the respective cylindrical centering elements 36a, 36a'.

The actuating pins 39, 40 can be depressed by a conical displacing disk 41a of a handle 41 which is provided with a knob 62. That end of the handle 41 which is remote from the knob 62 is provided with a sphere (not shown) received in a complementary concave socket 41A on the pilot valve body 2a. This enables the handle 41 to swivel in any desired direction. If desired, the ball and the socket 41A can be configurated in such a way that the handle 41 is confined to oscillatory movements in the plane of FIG. 1, under or aginst the action of one of the springs 32, 32'. The central or neutral position of the handle 41 is shown at 41c; the pins 39, 40 are then held in their outermost positions by the respective control springs 32, 32'. FIG. 1 shows the right-hand pin 40 in its idle position while the displacing disk 41a maintains the pin 39 in a depressed position.

The body 2a of the pilot valve 2 is further provided with two ports 33, 34, with a supply channel or inlet 46 which is connected to a pump P or an analogous source of pressurized fluid, a return channel or outlet 47 which is connected with a tank T, two bypass channels 49, 49' which can respectively connect the ports 33, 34 with the supply channel or inlet 46 or with the return channel or outlet 47, and two relatively weak helical springs 53, 53' which serve to bias the valve members 31, 31' upwardly, as viewed in FIG. 1. The springs 53, 53' react against the body 2a and bear against the lower or inner end faces or surfaces 31a, 31a' of the valve members 31, 31'. The pressure of fluid acting against the surfaces 31a, 31a' is the same as the pressure in chambers 57 and 61. Such fluid pressure opposes the movements of valve members 31, 31' in response to stressing of the respective control springs 32, 32'.

The fluid flow regulating valve 1 comprises a housing 1a which receives a single reciprocable valve element or spool 7. The housing 1a defines a first chamber 61 having a port 60 which is connected with the port 34 by a conduit 59, and a second chamber 57 connected to the port 33 by a conduit 55. A helical regulating spring 26 in the chamber 61 can urge the spool 7 in a direction to the right, as viewed in FIG. 1. A helical centering spring 16 in the chamber 57 tends to move the spool 7 to a neutral position. The housing 1a is further provided with ports 60a, 60b which are respectively connected to the tank T and pump P, and with ports 60c, 60d which are respectively connected to consumers A and B, e.g., to two discrete hydraulic motors.

In FIG. 1, the disk 41a of the handle 41 allows the actuating pin 40 to dwell in the extended position. The control spring 32' cooperates with the relatively weak helical spring 53' to maintain the valve member 31 in a neutral position in which a centrally located plunger 48a' of the valve member 32' seals the channel 46 from the bypass channel 49' and connects the channel 47 with the channel 49' by defining with the body 2a a predetermined gap b. Thus, the chamber 61 of the regulating valve 1 communicates with the tank T by way of the port 60, conduit 59, port 34, channel 49', gap b and channel 47. The pressure of fluid in the tank T is assumed to equal atmospheric pressure so that the fluid in the chamber 61 cannot move the spool 7 in a direction to the left, as viewed in FIG. 1.

In order to raise the pressure in the chamber 61, it is necessary to depress the actuating pin 40 so that the valve member 31' compresses the spring 53' and reduces the width of the gap $b$ to zero whereby the chamber 61 is sealed from the channel 47 and tank T. If the axial displacement of the actuating pin 40 suffices to move the valve member 31' beyond the position corresponding to that of the valve member 31, the plunger 48a' defines with the body 2a a gap which allows pressurized fluid to flow from the pump P through the channels 46, 49', port 34, conduit 59, port 60 and into the chamber 61. Due to the flow of fluid toward the chamber 61, the pressure in the path including the channel 49' is lower than the pump pressure. Such lower pressure acts upon the end face 31a' of the valve member 31' and displaces the valve member 31' upwardly toward the position in which the plunger 48a' seals the bypass channel 49' from the channels 46, 47 (see the position of the plunger 48a on the left-hand valve member 31). As the valve member 31' moves upwardly, it stresses the spring 32' whereby the latter resists the movement of the valve member with an increasing force which depends on the characteristic curve of the spring 32'. In the sealing position of the valve member 31', the fluid pressure in the chamber 61 is a function of the bias of the spring 32'. If such pressure were lower than determined by the bias of the spring 32', the valve member 31' would be shifted downwardly and would connect the chamber 61 with the pump P via channels 49', 46. Were the fluid pressure in the chamber 61 higher, the valve member 31' would rise and its plunger 48a' would establish communication between the tank T and chamber 61 by way of the channels 49', 46. Thus, the pressure of fluid in the chamber 61 is a function of the bias of the spring 32' in sealing position of the valve member 31'. Such pressure of fluid in the chamber 61 is invariably lower than the pump pressure and depends further on the extent to which the disk 41a has depressed the actuating pin 40. The bias of the spring 53' is so small that it can be disregarded; the spring 53' merely serves to hold the valve member 31' in the starting position when the disk 41a is disengaged from the pin 40.

The extent to which the spool 7 is displaced by pressurized fluid in the chamber 61 is a function of the characteristic of the spring 32' and of the position of the actuating pin 40. This determines the rate of fluid flow from the port 60a to the port 60c. The situation is analogous when the conduit 55 admits pressurized fluid to the chamber 57. The spool 7 is then moved in a direction to the right, as viewed in FIG. 1, to connect the port 60a with the port 60d and to connect the port 60b with the port 60c.

The extent of axial displacement of the spool 7 in response to depression of the pin 40 so that the valve member 31' assumes its sealing position is shown at S1. Such axial displacement is necessary to move the spool 7 from its neutral position to its intermediate position and approximates the distance S2 which the spool 7 must cover in order to connect the port 60a with the port 60c, i.e., to assume one of its operative positions.

The spool 7 is held in the illustrated neutral position by the helical centering spring 16 in chamber 57. This spool assumes such neutral position when the chambers 57, 61 communicate with the tank T, i.e., when the handle 41 assumes the neutral position 41c. The regulating spring 26 becomes effective only after the spool 7 has been shifted through the distance S1; from there on, the regulating spring 26 determines the axial position of the spool 7 in dependency on selected fluid pressure in the chamber 61. The characteristic curve of the regulating spring 26 is steeper than the curve of the centering spring 16. Consequently, the fluid pressure which is needed to move the spool 7 through the distance S1 (against the resistance of the centering spring 16) is much lower than the fluid pressure which is required to move the spool 7 through a distance exceeding S1, i.e., to an operative position. The initial stressing of the regulating spring 26 exceeds by a predetermined value that stress upon the centering spring 16 which is produced when the spool 7 has been moved through the distance S1 to its intermediate position. This renders it possible to select a greater tolerance for that bias of the spring 32' which is needed to produce the initial fluid pressure without risking a movement of the valve member 7 to an operative position when the chamber 61 receives fluid under initial pressure. As mentioned above, the ports 60a and 60c connect the tank T with the consumer A when the spool 7 penetrates deeper into the chamber 57; at the same time, the ports 60b and 60d connect the pump P with the consumer B.

In the illustrated position of the handle 41, the disk 41a depresses the actuating pin 39. Therefore, and contrary to the showing of FIG. 1, the spool 7 is displaced in a direction toward the chamber 61 to connect the tank T with the consumer B by way of a bore 1b and the pump P with the consumer A.

The plungers of the spool 7 are provided with grooves 7a to insure accurate regulation of third flow in certain axial positions of the spool.

The springs 16 and 26 can be replaced by a single spring which normally holds the spool 7 in the illustrated neutral position and also serves as a means for performing the functions of the regulating spring 26.

An important advantage of the improved valve assembly is that the distance S2 depends almost exclusively on the initial stressing of the control spring 32', and more particularly on the corresponding fluid pressure in the chamber 61. Therefore, the distance S2 can be readily increased to a maximum value without influencing the maximum change $a$ in axial length of the control spring 32'.

Another important advantage of the valve assembly is that the person manipulating the handle 41 immediately senses when the spool 7 has been moved through the distance S1 (which approximates the distance S2), i.e., that the spool is about to move beyond its intermediate position (which it assumes after it has covered the distance S1 from the neutral position of FIG. 1) to one of several operative positions in which the spool changes the rate of fluid flow between the ports 60a, 60b and ports 60c, 60d. This is due to the fact that, when the valve member 31' seals the channel 49' from the channels 46 and 47, further inward movement of the pin 40 by way of the disk 41a is possible only if the person in charge overcomes the rapidly increasing resistance of the regulating spring 26 in the chamber 61. As mentioned above, the bias of the regulating spring 26 remains practically unchanged while the fluid in the chamber 61 moves the spool 7 through the distance S1.

However, if the spool 7 is moved beyond the intermediate position, the operator must overcome the bias of the regulating spring 26 whose characteristic curve is much steeper than that of the centering spring 16. Thus, the operator feels that the handle 41 offers a suddenly increased resistance to pivotal movement in a direction to further depress the actuating pin 40 in order to deform the control spring 32' and to move the valve member 31' to a position in which the plunger 48a' allows fluid to flow from the channel 46 into the chamber 61 so that the inflowing fluid continues to move the spool 7 in a direction toward the chamber 57. The fluid must overcome the resistance of the regulating spring 26 and acts against the end face 31a' so as to urge the valve member 31' upwardly and to stress the control spring 32' which opposes further depression of the pin 40. The distance S1 being nearly equal to the distance S2, the spool 7 will cover the difference S2–S1 in response to a rather small compression of the regulating spring 26.

Figure 2:
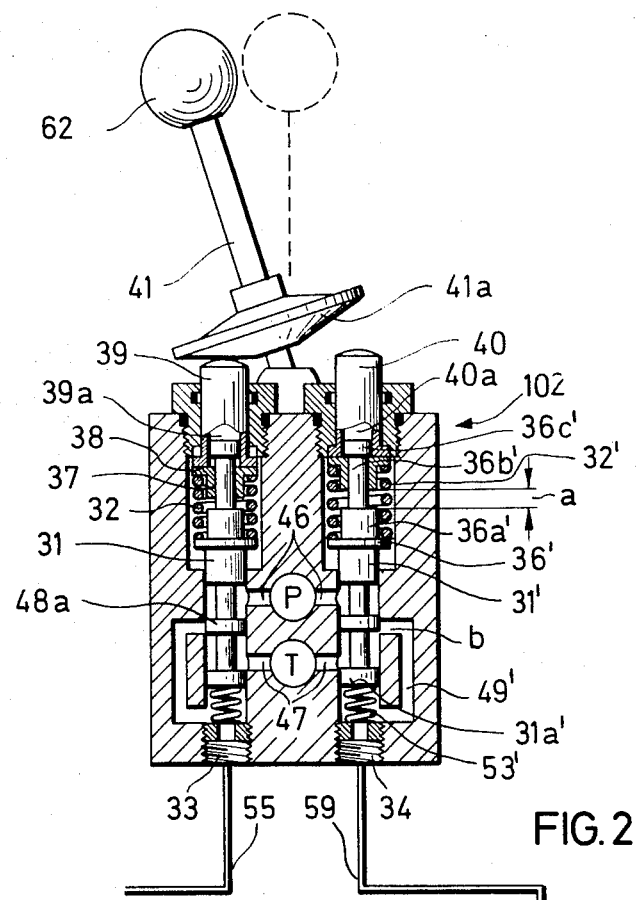
FIG. 2 is a similar axial sectional view of a second valve assembly employing a modified fluid flow regulating valve.
Figure 2:
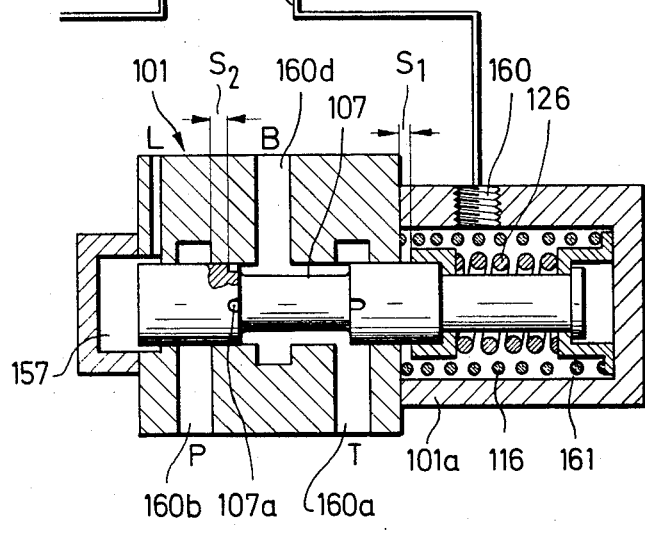

FIG. 2 illustrates a valve assembly wherein the pilot valve 102 comprises a single control spring 32' and a single valve member 31' (or wherein the spring 32 and valve member 31 are not used) and wherein the centering spring 116 is installed in the chamber 161 of the fluid flow regulating valve 101. The centering spring 116 normally maintains the reciprocable valve element or spool 107 in the illustrated neutral position. The spool 107 then allows fluid to flow between the ports 160a and 106d. If the handle 41 is pivoted clockwise, as viewed in FIG. 2, to depress the actuating pin 40, the chamber 161 receives pressurized fluid by way of the port 160 and the spool 107 moves in a direction to the left and seals the port 160a from the port 160d while at the same time allowing pressurized fluid to flow from the port 160b to the port 160d. The extent to which the spool 107 moves beyond the intermediate position (in which the clearance S1 is reduced to zero) depends on the pressure of fluid in the chamber 161 and on the characteristic curves of the regulating spring 126 and centering spring 116. The reference character 107a denotes a groove in one of the plungers of the spool 107. All other reference characters shown in FIG. 2 but not specifically mentioned denote parts which are identical with or clearly analogous to similarly referenced parts of the valve assembly shown in FIG. 1.

It will be noted that the left-hand chamber 157 of the valve housing 101a is connected with the atmosphere by way of a bore L, i.e., the chamber 157 is not connected with the conduit 55 of the pilot valve 102.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A valve assembly, comprising a regulating valve including a housing having a fluid-receiving chamber and a valve element movable in said housing from a neutral position, through an intermediate position, and to a plurality of operative positions in response to admission of pressurized fluid into said chamber; and a pilot valve having a body provided with inlet means connected to a source of pressurized fluid and port means connected to said chamber, a valve member movable in said body to control the flow of fluid between said inlet means and said port means and having a surface exposed to fluid pressure prevailing in said chamber, control spring means mounted in said body and being deformable to thereby displace said valve member against the opposition of fluid pressure acting against said surface, and means for subjecting said control spring means to a relatively small initial deforming force so as to balance the fluid pressure acting against said surface and to thereby maintain said valve member in a position wherein said valve member seals said port means from said inlet means in said intermediate position of said valve element, and to a relatively wide range of additional deforming forces so as to displace said valve member and to allow additional pressurized fluid to enter said chamber and to move said valve element to one of said operative positions.

2. A valve assembly as defined in claim 1, wherein said regulating valve further comprises regulating spring means arranged to oppose the movement of said valve element beyond said intermediate position.

3. A valve assembly as defined in claim 2, wherein said regulating valve further comprises centering spring means for urging said valve element to said neutral position, the characteristic curve of said regulating spring means being steeper than the characteristic curve of said centering spring means.

4. A valve assembly as defined in claim 1, wherein said body is further provided with fluid-discharging outlet means, said valve member being arranged to seal said port means from said inlet means and from said outlet means in said intermediate position of said valve element.

5. A valve assembly as defined in claim 1, wherein said means for subjecting said control spring means to said deforming forces comprises actuating means movably mounted in said body and manually operated means for moving said actuating means whereby said actuating means subjects said control spring means to the action of a deforming force whose magnitude is a function of the extent of movement of said actuating means relative to said body.

6. A valve assembly as defined in claim 1, wherein said body is further provided with fluid-discharging outlet means communicating with said chamber by way of said port means in said neutral position of said valve element.

7. A valve assembly as defined in claim 1, wherein said regulating valve is a multi-way distributor valve and said valve element is a spool which is reciprocable in said housing.

8. A valve assembly as defined in claim 1, further comprising regulating spring means arranged to oppose the movement of said valve element to said intermediate position with a first force and to oppose the movement of said valve element to one of said operative positions with a second force greatly exceeding said first force.

9. A valve assembly as defined in claim 8, wherein said valve member connects said chamber and said port means with the atmosphere in said neutral position of said valve element and seals said chamber from the atmosphere and from said inlet means in said intermediate position of said valve element.

10. A valve assembly as defined in claim 1, wherein said housing is provided with a second fluid-receiving chamber and said body is provided with second part means connected to said second chamber, said pilot valve further comprising a second valve member and second control spring means arranged to control the flow of fluid between said inlet means and said second port means whereby the fluid in said second chamber tends to move said valve element in a direction counter to the direction of movement of said valve element in response to admission of fluid into said first mentioned chamber.

* * * * *